(12) United States Patent
Wang

(10) Patent No.: US 8,381,194 B2
(45) Date of Patent: *Feb. 19, 2013

(54) METHODS AND APPARATUSES FOR SELECTIVE CODE COVERAGE

(75) Inventor: Wenguang Wang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 787 days.

This patent is subject to a terminal disclaimer.

(21) Appl. No.: 12/550,318

(22) Filed: Aug. 28, 2009

(65) Prior Publication Data

US 2011/0047532 A1  Feb. 24, 2011

Related U.S. Application Data

(63) Continuation-in-part of application No. 12/544,191, filed on Aug. 19, 2009.

(51) Int. Cl.
*G06F 9/44* (2006.01)

(52) U.S. Cl. ........ 717/131; 717/126; 717/127; 717/130; 717/140; 717/141; 714/38.1; 714/E11.207; 714/E11.209

(58) Field of Classification Search .................. None
See application file for complete search history.

(56) References Cited

U.S. PATENT DOCUMENTS

| | | | |
|---|---|---|---|
| 5,737,609 A * | 4/1998 | Reed et al. ..................... | 717/126 |
| 5,758,061 A * | 5/1998 | Plum ............................. | 714/35 |
| 5,778,169 A | 7/1998 | Reinhardt | |
| 6,311,327 B1 | 10/2001 | O'Brien et al. | |
| 6,430,741 B1 | 8/2002 | Mattson et al. | |
| 6,721,941 B1 * | 4/2004 | Morshed et al. ............. | 717/127 |
| 6,874,140 B1 | 3/2005 | Shupak | |
| 6,973,417 B1 * | 12/2005 | Maxwell et al. .................. | 703/2 |
| 7,028,290 B2 | 4/2006 | Srivastava et al. | |
| 7,353,500 B2 * | 4/2008 | Ioku et al. ..................... | 717/127 |
| 2002/0095660 A1 * | 7/2002 | O'Brien et al. ............... | 717/127 |
| 2003/0093716 A1 | 5/2003 | Farchi et al. | |
| 2003/0196188 A1 * | 10/2003 | Kuzmin ........................ | 717/124 |
| 2003/0204836 A1 | 10/2003 | Srivastava et al. | |
| 2004/0025088 A1 * | 2/2004 | Avvari et al. ................... | 714/38 |
| 2004/0025093 A1 | 2/2004 | Willy et al. | |

(Continued)

OTHER PUBLICATIONS

Title: Code-coverage Based Test Vector Generation for SystemC Designs, author: Dias Junior et al, source: IEEE, dated: Mar. 9, 2007.*

Title: The impact of software evolution on code coverage information, author: Elbaum, S et al, dated: 2001, source: IEEE.*

"Intel Compiler Code-Coverage and Test-Prioritization Tools", White Paper, Intel Software Development, Jun. 16, 2005, 17 pages, www.intel.com/software/products.

Richard Banks. "How to Exclude a Method From Code Coverage", Dec. 6, 2007, 10 pages.

*Primary Examiner* — Chameli Das

(74) *Attorney, Agent, or Firm* — Blakely, Sokoloff, Taylor & Zafman LLP

(57) ABSTRACT

Methods and apparatuses that collect code coverage information for selected code locations when executing executable code are described. Source code in one or more files may be annotated at the selected code locations. The executable code may be compiled from the annotated source code using standard compilers. The code coverage information may be collected into a run time data store accessible by other applications. In response to receiving a code coverage request, the code coverage information can be retrieved from the data store to compare with annotations identified from the source code. A code coverage report can be generated to indicate whether one or more of the selected code locations are not covered when executing the executable code.

24 Claims, 7 Drawing Sheets

U.S. PATENT DOCUMENTS

| | | |
|---|---|---|
| 2004/0133882 A1* | 7/2004 | Angel et al. ................. 717/130 |
| 2006/0101416 A1 | 5/2006 | Callahan, II et al. |
| 2006/0129994 A1 | 6/2006 | Srivastava et al. |
| 2006/0195724 A1* | 8/2006 | Filho ............................... 714/35 |
| 2007/0043531 A1 | 2/2007 | Kosche et al. |
| 2007/0150879 A1* | 6/2007 | Rangarajan et al. .......... 717/154 |
| 2007/0234309 A1 | 10/2007 | Davia et al. |
| 2008/0098207 A1 | 4/2008 | Reid et al. |
| 2009/0165135 A1* | 6/2009 | Lomont et al. .................. 726/22 |
| 2009/0249044 A1* | 10/2009 | Citron et al. ................... 712/227 |
| 2009/0249305 A1 | 10/2009 | Li et al. |
| 2009/0249309 A1* | 10/2009 | Li et al. ......................... 717/132 |
| 2009/0293044 A1* | 11/2009 | Boettcher et al. ............. 717/131 |
| 2009/0313607 A1* | 12/2009 | Harding et al. ............... 717/125 |
| 2010/0017620 A1* | 1/2010 | Horne et al. ................... 713/187 |
| 2011/0010715 A1* | 1/2011 | Papakipos et al. ............ 718/100 |

* cited by examiner

```
#include <coverage.h>                    601
CODE_COVERAGE_CHECK_INIT;

void conv_str(int precomposed, char *inputBuffer, char *outputBuffer)
{
        TextEncodingVariant variant;
        if (precomposed) {
                CODE_COVERAGE_CHECK;              603
                variant = kUnicodeCanonicalCompVariant;
        } else {                                   607
                CODE_COVERAGE_CHECK;
                debug_msg("%s:%d",__func__,__LINE__);
                variant = kUnicodeCanonicalDecompVariant;
        }
        ...
}
```
605 encompasses the void conv_str function body.

701 → kext/newfs_udf.cpp:416: 1
703 → kext/newfs_udf.cpp:419: 1

METHODS AND APPARATUSES FOR SELECTIVE CODE COVERAGE

CROSS REFERENCES TO RELATED APPLICATIONS

The present invention is a continuation-in-part of U.S. patent application Ser. No. 12/544,191, filed Aug. 19, 2009, now pending, and the disclosures of which are considered part of and are incorporated by reference in the disclosure of this application.

FIELD OF INVENTION

The present invention relates generally to code development tools. More particularly, this invention relates to selective code coverage tools.

BACKGROUND

With the increasing size of software code, correctness verification is often conducted incrementally focusing on a few critical parts of the code in each test run. For example, modern kernel code for a computing device usually includes a large portion of code handling a variety of code branches. Usually, a kernel test may target one or two code branches without regard to other parts of the system that are of no interest in the current testing, or those handling rarely occurred boundary conditions, such as when a hard drive returns a wrong bit, when a network is broken, or other unusual error conditions. However, most existing code coverage tools attempt to cover every portion of target software, for example, to report a percentage of overall code covered in the testing. Therefore, comprehensive software test using such tools could waste disproportionate system and engineering resources on uninterested or uncritical software code.

Furthermore, to monitor each instruction execution on target software, existing code coverage tools usually require more functionalities than what standard compilers would offer. Such requirement, however, adds more complexity to software development environment. In addition, an executable built for existing code coverage tools tends to include significant amount of overhead code, resulting in a code size much larger than a corresponding executable built for release using standard compilers. Moreover, even if an existing code coverage tool, which is designed to cover the entire body of software to be tested, allows manual removal of selected portions of software code from coverage analysis, it can be cumbersome, laborious, or practically impossible to turn off coverage analysis of a large portion of source code when, for example, the source code files includes millions of code lines.

Therefore, traditional code coverage tools do not provide a simple and efficient mechanism for selective code coverage analysis.

SUMMARY OF THE DESCRIPTION

An embodiment of the present invention can include methods and apparatuses that collect code coverage information for selected code locations when executing executable code. Source code in one or more files may be annotated at the selected code locations. These selected code locations can be a very limited number of code portions which are "hand picked" in order to limit the scope of code coverage detection. In one embodiment, if a portion of code is not annotated, then no code coverage analysis will be preformed or recorded for that partition; in other words, the system is configured so that the default is no code coverage analysis for the entire code and code coverage analysis of any portion requires that this portion be annotated to cause code coverage analysis. The executable code may be compiled from the annotated source code using standard compilers. The code coverage information may be collected into a run time data store accessible by other applications. In response to receiving a code coverage request, the code coverage information can be retrieved from the data store to compare with annotations identified from the source code. A code coverage report can be generated to indicate whether one or more of the selected code locations are not covered (e.g. no tested or not executed) when executing the executable code.

An embodiment of the invention can be used for software which does not normally complete execution, such as an operating system's (OS) kernel. Hence, code coverage analysis can be performed on selected portions of an operating system's kernel even as it continues to run after data for a code coverage report has been obtained and after the report has been created. This can allow for interactive testing to generate multiple reports showing code coverage (e.g. whether selected annotated code portions were executed) of the OS's kernel. Further, this embodiment of code coverage analysis can allow for the generation of a code coverage report at any point in time of execution of the compiled code which includes the annotations. In an implementation of this embodiment, the inserted coverage code can include a programming interface or command to allow the creation of and access to a data store which is used to store collected code coverage information as described herein.

In an alternative embodiment, an executable code can be compiled from annotated source code inserted with one or more copies of coverage code at selected code locations. The executable code can include indicators corresponding to the selected code locations of the source code. A run time data store can be updated by accessing the indicators when executing the executable code. Code coverage information for the selected code locations annotated in the source code can be retrieved from the data store. A code coverage report can be generated to indicate the number of actual executions on a selected code location based on the retrieved code coverage information.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 6 is a code sample illustrating annotated source code for selective code coverage according to one embodiment of the present invention;

FIG. 7 is a report sample illustrating a code coverage report for selective code coverage according to one embodiment of the present invention;

DETAILED DESCRIPTION

Figure 1:
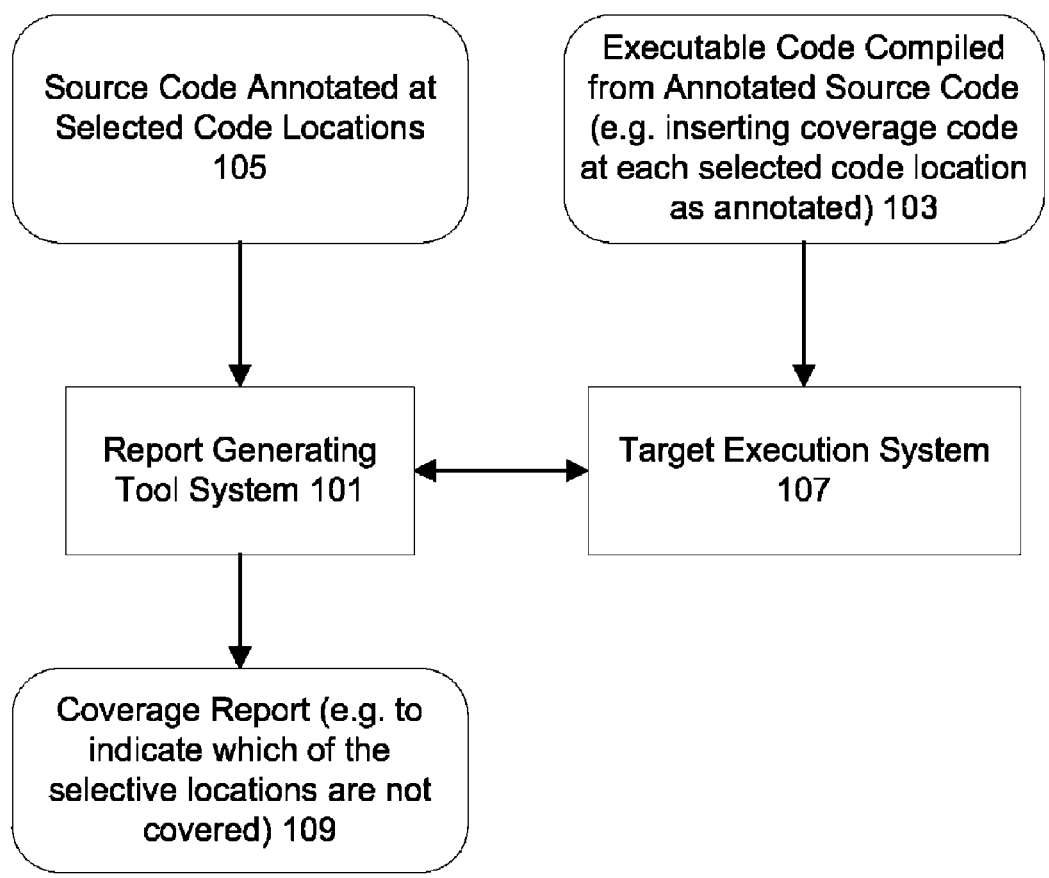
FIG. 1 is a block diagram illustrating one embodiment of a system for a selective code coverage tool.

Methods and apparatuses for selective code coverage are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

In one embodiment, selective code coverage can allow a programmer to annotate specific blocks of code. A compiler may detect annotated blocks and modify the code so that when executed, the code can output to a buffer in memory the file and line number for each line of code in the scope of the annotation that has actually executed during a given test run. A selective code coverage tool can selectively turn coverage monitoring for targeted code on and off via source code annotation.

In one embodiment, selective code coverage may enable code coverage test with minimal overhead and/or impact on actual performance of target software. A programmer could insert a few lines of annotations in key branches (e.g. using flags) for selecting code to be covered in a test run. Selective code coverage may not need additional tool/compiler/debugger support other than standard compilers (e.g. C language compiler). Thus, selective code coverage can be conducted in a manner independent of tools/compilers/debuggers. An executable can be built for final release based on the same annotated source code for selective code coverage using simple flag switches in compiler settings.

In some embodiments, annotations in selective code coverage can be based on macro mechanism for inserting coverage code with low execution overhead to check code coverage. The coverage code can remember execution traces, e.g. based on line numbers and file names, into a small data structure. A report generator can scan the annotations from source files to compare with the execution traces stored in the data structure and generate a report indicating which annotated code have not executed. In one embodiment, a report generator can periodically generate reports for selective code coverage while a target executable code (e.g. a kernel) is running.

FIG. 1 is a block diagram illustrating one embodiment of a system for a selective code coverage tool. System 100 may include tool system 101 coupled with target execution system 107 to generate a code coverage report 109 for selected code locations as annotated in source code 105. A code location may include a source file name and a line number within the source file. Annotated source code 105 may correspond to one or more source code files. In some embodiments, tool system 101 and target execution system 107 may be based on the same data processing system or computer. When annotated source code 105 is compiled, a copy of coverage code may replace each annotation. As a result, executable code 103 compiled from annotated source code 105 can include instructions compiled from the original source code and the coverage code.

In one embodiment, target execution system 107 may execute executable code 103 to collect code coverage information for selected locations as annotated in annotated source code 105, according to, for example, instructions compiled from coverage codes inserted at the selected code locations. Tool system 101 can retrieve the code coverage information from target execution system 107, e.g. during run time while executing executable code 103. In one embodiment, tool system 101 may generate a code coverage report 109 by comparing annotated source code 105 with the code coverage information retrieved from target execution system 107. Code coverage report 109 can indicate whether a selected code location in the original source code is covered or not when target execution system 107 executing executable code 103.

Figure 2:
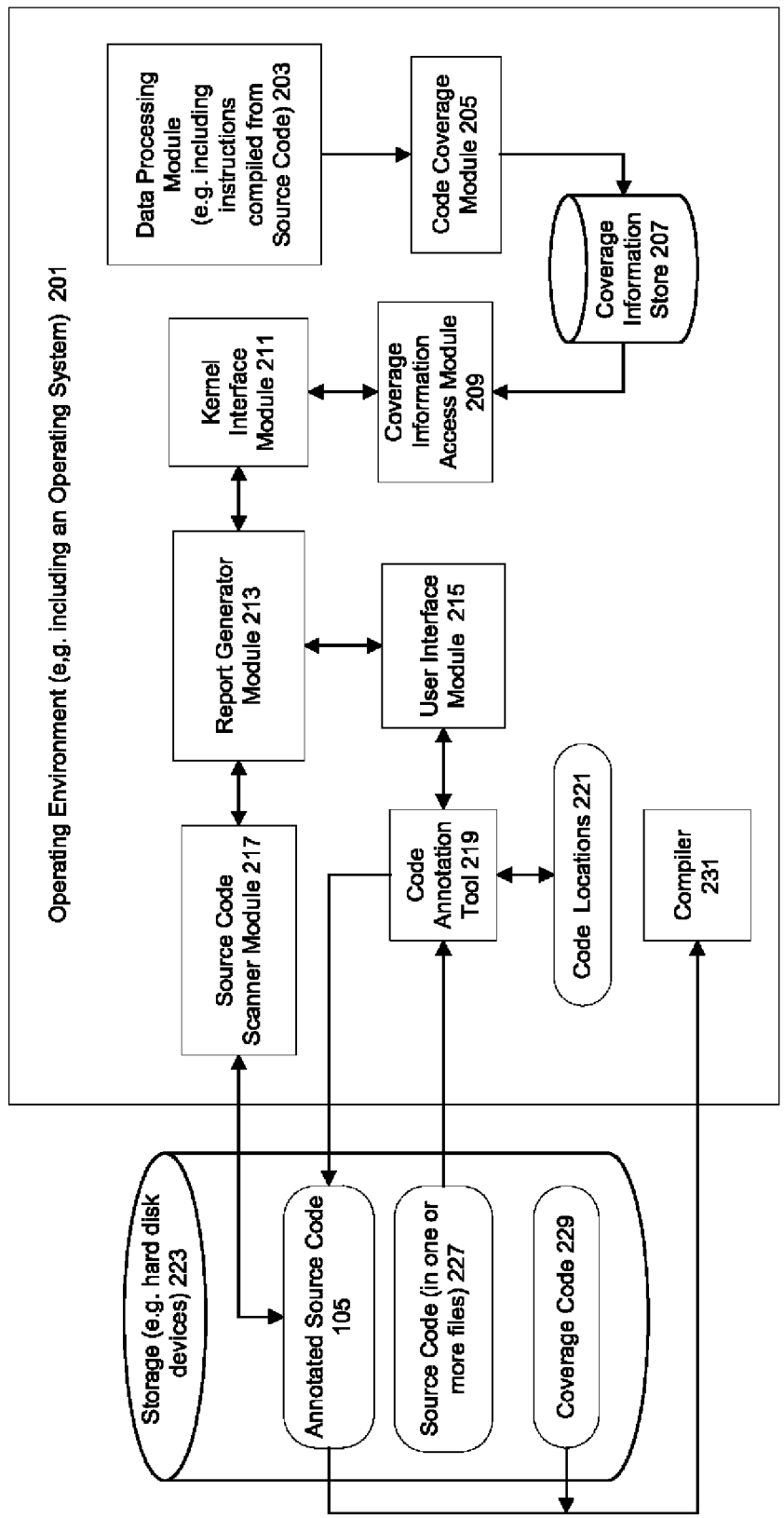
FIG. 2 is a block diagram illustrating one embodiment of a system to perform selective code coverage.

FIG. 2 is a block diagram illustrating one embodiment of a system to perform selective code coverage. System 200 may include an operating environment 201 (e.g. an operating system) for a data processing system such as tool system 101 and/or target execution system 107 of FIG. 1. Source code 227 may include one or more files stored in storage 223, such as a hard disk drive or other storage devices locally or remotely coupled with system 201. A code annotation tool 219 may generate annotated source code 105 from original source code 227 according to code locations 221 specified via user interface module 215. In one embodiment, code annotation tool 219 may insert an annotation (e.g. representation of a macro definition in a code) at code locations in source code 227 as annotated source code 105 (e.g. according to code locations 221). A code location may include a file name identifying a file in source code 227 and a line number for a line of code within the file identified by the file name. In one embodiment, code coverage for a code location within a code may indicate whether the instructions corresponding to the code at the code location were executed when running an executable compiled from the code.

In one embodiment, compiler 231 may compile annotated source code 105 to generate executable code including data processing module 203 and code coverage module 205. Data processing module 203 may include instructions compiled from source code 227. In one embodiment, compiler 231 may insert coverage code 229 into each annotated code location in annotated source code 105 to generate executable code. Code coverage module 205 may include instructions compiled from coverage code 229 via compiler 231. In one embodiment, data processing module 203 may include indicators corresponding to code locations 221 as annotated in annotated source code 105. Each indicator may be an index allocated in memory when the executable code compiled from annotated source code 105 is loaded in the memory for execution. Executing instructions compiled from the code at a code location corresponding to an indicator may cause the indicator to be accessed for code coverage module 205 to collect code coverage information into coverage information store 207 for the code location.

In one embodiment, coverage information store 207 may include code coverage information associated with a file name and a line number for a corresponding code location. Code coverage information can include a count indicating number of times the code at a code location has been executed. In one embodiment, coverage information access module 209 may retrieve code coverage information for code locations 221 from code coverage information store 207. An interface (e.g. an Application Programming Interface or a system command) to coverage information access module 209 may be registered in a kernel interface module 211 for an application, such as report generator module 213, to access code coverage information stored in coverage information store 207. Coverage code 229 may include registration codes for registering the interface, e.g. in system 201. In one embodiment, coverage information access module 209 may include instructions compiled from coverage code 229.

Report generator module 213 may compare annotated source code 105 and code coverage information received from coverage information store 207 to generate a report indicating whether source code 227 annotated at code locations 221 have been executed (or covered). In one embodiment, report generator module 213 may determine code locations 221 from annotated source code 105 via source code scanner module 217 to report if a code location annotated in annotated source code 105 is covered. In some embodiments, report generator module 213 can generate a report indicating which annotated code locations are not covered in response to a user request from user interface module 215.

Figure 3:
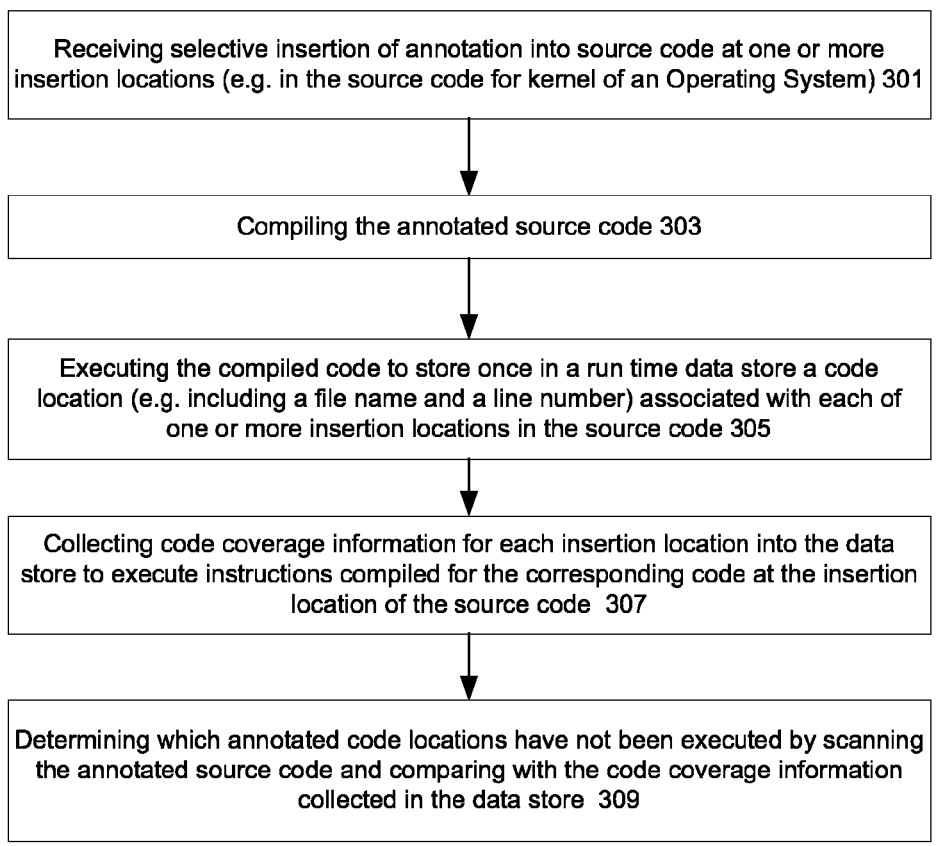
FIG. 3 is a flow diagram illustrating one embodiment of a process to generate code coverage report for selected source code locations.

FIG. 3 is a flow diagram illustrating one embodiment of a process to generate code coverage report for selected source code locations. Exemplary process 300 may be performed by a processing logic that may comprise hardware (circuitry, dedicated logic, etc.), software (such as is run on a dedicated machine), or a combination of both. For example, process 300 may be performed by some components of system 200 of FIG. 2. In one embodiment, at block 301, the processing logic of process 300 can receive selective insertion of annotation into source code, such as source code 227 of FIG. 2, at one or more insertion locations. An annotation may include one or more code symbols conforming to syntax requirements for a programming language of the source code. Each insertion location may represent a code location, such as in code locations 221 of FIG. 2. In one embodiment, selective insertion of annotation may be based on a text editor editing the source code to generate annotated source code (e.g. annotated source code 105 of FIG. 1) inserted with annotations at selected code locations.

At block 303, the processing logic of process 300 may compile annotated source code, for example, based on compiler 231 of FIG. 2. The processing logic of process 300 may use one or more compiler settings (e.g. compilation flags, parameters values etc.) to compile the annotated source code. In one embodiment, executable code for selective code coverage can be built using similar compiler settings for building executable code for release. For example, a common compiler, such as compiler 231 of FIG. 2, can build the executable code for code coverage and the executable code for release based on whether a flag is on or off in the compiler settings.

In one embodiment, the processing logic of process 300 may execute executable code compiled from an annotated source code to store once a code location (or insertion location) associated with an annotation in the annotated source code. A code location may include a file name and a line number. The processing logic of process 300 may allocate a run time data store (e.g. a data structure), such as coverage information store 207 of FIG. 2, for storing code locations. In one embodiment, the processing logic of process 300 may create a location indicator for an annotation to index the data storage for storing a corresponding code location (e.g. file name and/or line number). For example, the processing logic of process 300 can store a line number and/or a pointer to a file name as indexed to the corresponding code location. Thus, the actual file name for a file can be stored only once when multiple code locations are annotated inside the file. The processing logic of process 300 may store code locations for one or more annotations included in the annotated source code. In one embodiment, each code location stored in the data store may indicate coverage of the code at the code location.

At block 307, according to one embodiment, the processing logic of process 300 may collect code coverage information for an insertion location (or code location) into a data store when executing instructions compiled for the corresponding code at the code location of the source code. In one embodiment, code coverage information may include a number of times instructions for a certain code location have been executed. In another embodiment, code coverage information may indicate whether instructions for a certain code location have been executed. The processing logic of process 300 may update the data store indexed by a location indicator corresponding to an annotation in the source code to collect code coverage information.

In one embodiment, at block 309, the processing logic of process 300 may determine which code locations annotated in source code have not been executed (or covered) by comparing annotated source code and coverage information collected in a run time data store. The processing logic of process 300 may scan the annotated source code, e.g. annotated source code 105, to identify which code locations have been annotated. In one embodiment, the processing logic of process 300 may retrieve code coverage information collected in the data store via an API interface registered to a kernel system. The code coverage information may include one or more code locations which have been covered. In one embodiment, the processing logic of process 300 may determine a code location identified from the annotated source code is not covered if the code coverage information does not include the code location.

Figure 4:
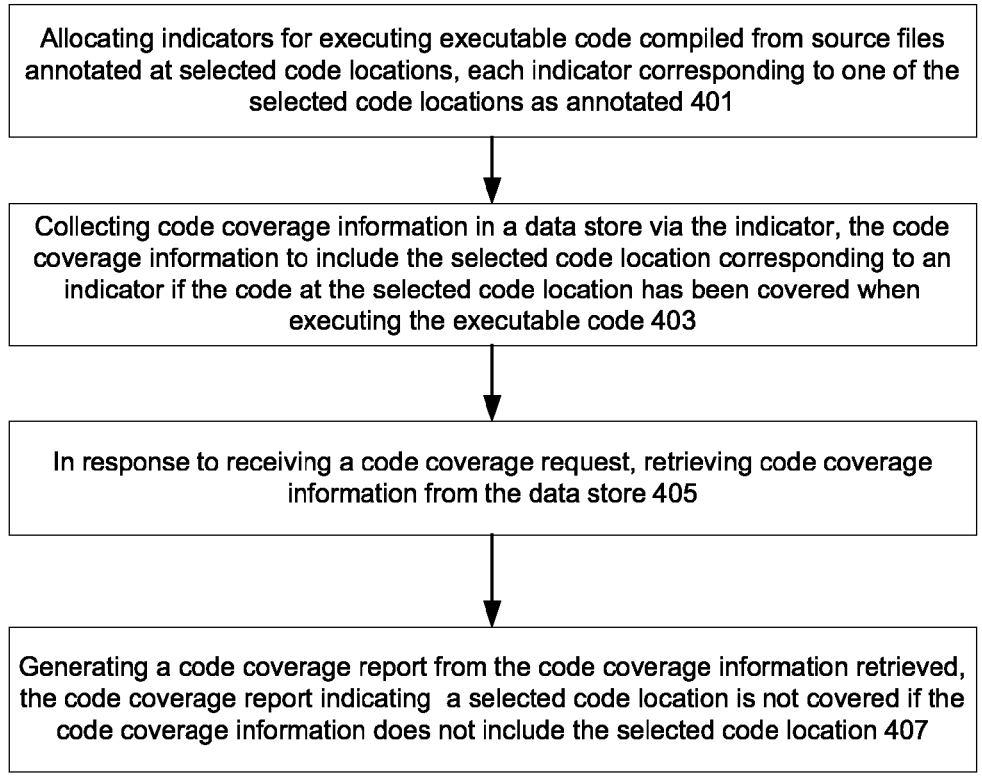
FIG. 4 is a flow diagram illustrating one embodiment of a process to collect code coverage information via indicators allocated for selected code locations.

FIG. 4 is a flow diagram illustrating one embodiment of a process to collect code coverage information via indicators allocated for selected code locations. Exemplary process 400 may be performed by a processing logic that may comprise hardware, software, or a combination of both. For example, process 400 may be performed by some components of system 200 of FIG. 2. In one embodiment, at block 401, the processing logic of process 400 can allocate indicators in memory for executing executable code compiled from annotated source code, each indicator corresponding to a selected code location as annotated in the annotated source code. An indicator may be accessed when instructions compiled from the code for the corresponding code location are executed (or when the code or the code location is covered)

At block 403, the processing logic of process 400 can collect code coverage information in a data store (or data structure) via indicators. The processing logic for process 400 may allocate the data store dynamically while executing instructions compiled from annotated. In one embodiment, an indicator may be associated with a unique value to index the collected code coverage information in the data store. Code coverage information may include code location (e.g. a file name or a pointer to the file name, and/or a line number) for the corresponding code covered. In one embodiment, the processing logic of process 400 may determine if a corresponding entry for an indicator exists in the data store when the indicator is accessed. The processing logic of process 400 may store the code location (e.g. a file name or a pointer to the file name and/or the line number) corresponding to the indicator in the data store once, e.g. the first time an entry is created in the data store, for the indicator. In some embodiments, the processing logic of process 400 may update (e.g. increment) a counter associated with an indicator in the data store when the indicator is accessed (or the code is covered).

At block 405, the processing logic of process 400 may retrieve code coverage information from a data store in response to a request received (e.g. a user request). The processing logic of process 400 may receive the request via an interface registered (e.g. in a system kernel) according to instructions compiled from annotated code. The code coverage information retrieved may indicate, up to the time of retrieval, which selected code locations in a source code as annotated have been covered. At block 407, the processing logic of process 400 can generate a code coverage report from the code coverage information retrieved. For example, the processing logic of process 400 can compare selected code locations annotated in a source code with the code location retrieved (e.g. based on file name and/or line number) to determine if a selected code location is not covered.

Figure 5:
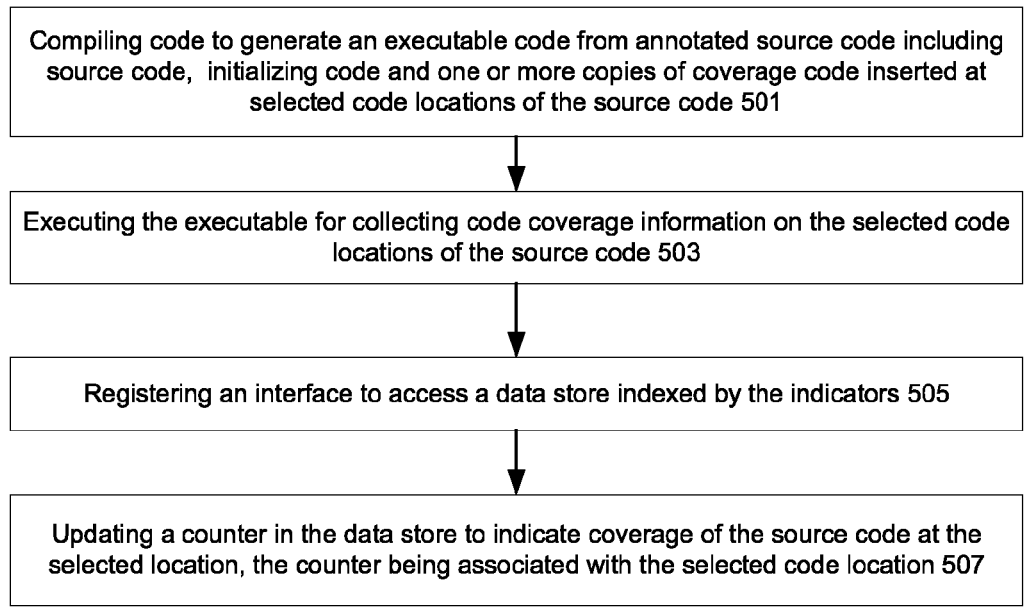
FIG. 5 is a flow diagram illustrating one embodiment of a process for selective code coverage according to an executable compiled from a source code annotated at selected code locations.

FIG. 5 is a flow diagram illustrating one embodiment of a process for selective code coverage according to an executable compiled from a source code annotated at selected code locations. Exemplary process 500 may be performed by a processing logic that may comprise hardware, software, or a combination of both. For example, process 500 may be performed by some components of system 200 of FIG. 2. In one embodiment, at block 501, the processing logic of process 500 can compile executable code from annotated source code. For example, the processing logic of process 500 can insert a copy of coverage code to each selected location of the source code as annotated. The processing logic of process 500 can store mapping information to identify a code location (e.g. a file name and/or a line number) with an instruction compiled from the source code at the code location. In one embodiment, the processing logic of process 500 may insert an initializing (or initialization) code to the annotated source code to compile with the coverage code. The processing logic of process 500 may compile the annotated source code using the same compilation settings to compile the source code (i.e. without annotations) into a release executable for a product (e.g. optimized in execution speed and code size). The executable code may include instructions of the release executable.

At block 503, the processing logic of process 500 can execute the executable for collecting code coverage information on the selected code locations of the source code. For example, a code location may represent one of a number of branches for a conditional statement of a source code. The code coverage information may indicate whether or how many times the corresponding of branch has been executed. In one embodiment, at block 505, the processing logic of process 500 may register an interface (e.g. a programming interface or a command) to access a data store which stores collected code coverage information. The processing logic of process 500 may allocate the data store (e.g. a data structure) based on instructions compiled from an initializing code inserted into the source code. The processing logic of process 500 may register the interface to access the data store based on instructions compiled from the initializing code.

In one embodiment, at block 507, the processing logic of process 500 can update a counter in a data store to indicate coverage of the source code at the selected location. A counter may include a binary value to indicate whether a corresponding code location has been covered during a test run. In some embodiments, a counter may include an integer value indicating the number of times the corresponding code location has been covered. The processing logic of process 500 may associate code coverage information collected in the data store with the corresponding code location. For example, an entry for the code location in the data store may store code coverage information including a counter, a file name and a line number for the code location. In one embodiment, the processing logic of process 500 may allocate a location indicator which can be accessed when instructions compiled from the code at the corresponding code location are executed. The processing logic of process 500 can identify a file name and a line number for the location indicator to represent the corresponding code location in the data store.

FIG. 6 is a code sample illustrating annotated source code for selective code coverage according to one embodiment of the present invention. For example, sample code 600 may be part of annotated source code 105 of FIG. 1. An annotation may be a single line of code (e.g. a text string) representing a block of code. Code 605 may include eight lines of code as a portion of the source code. Annotations 603 and 607 may be inserted at two selected code locations of the source code. For example, annotations 603 and 607 may represent two branches of a conditional statement in code 605. In one embodiment, two copies of coverage code may be inserted to replace annotations 603 and 607 when compiling the source code. Each copy of coverage code may be a block of code including the code for allocating a location indicator. Annotation 601 may represent initializing code for the coverage code. In one embodiment, annotations 601, 603 and 607 may be based on macro implementations of a programming language (e.g. C Language) for the source code.

FIG. 7 is a report sample illustrating a code coverage report for selective code coverage according to one embodiment of the present invention. For example, report 700 may be generated via report generator module 213 of FIG. 2. Report 700 may include code coverage information retrieved for two selected code locations 701, 703. For example, code coverage information for code location 701 may indicate a count 709 (e.g. "1") for executing (or exercising) source code located at line number 707 (e.g. "416") in a file with file name (or file path) 705 (e.g. "kext/newfs_udf.cpp"). Count 709 may represent the number of times code location 701 has been executed up to when report 700 is generated. In one embodiment, a corresponding executable may still execute while report 700 is generated. In some embodiments, a report may include representation of selected code locations which are not exercised (or covered).

Figure 8:
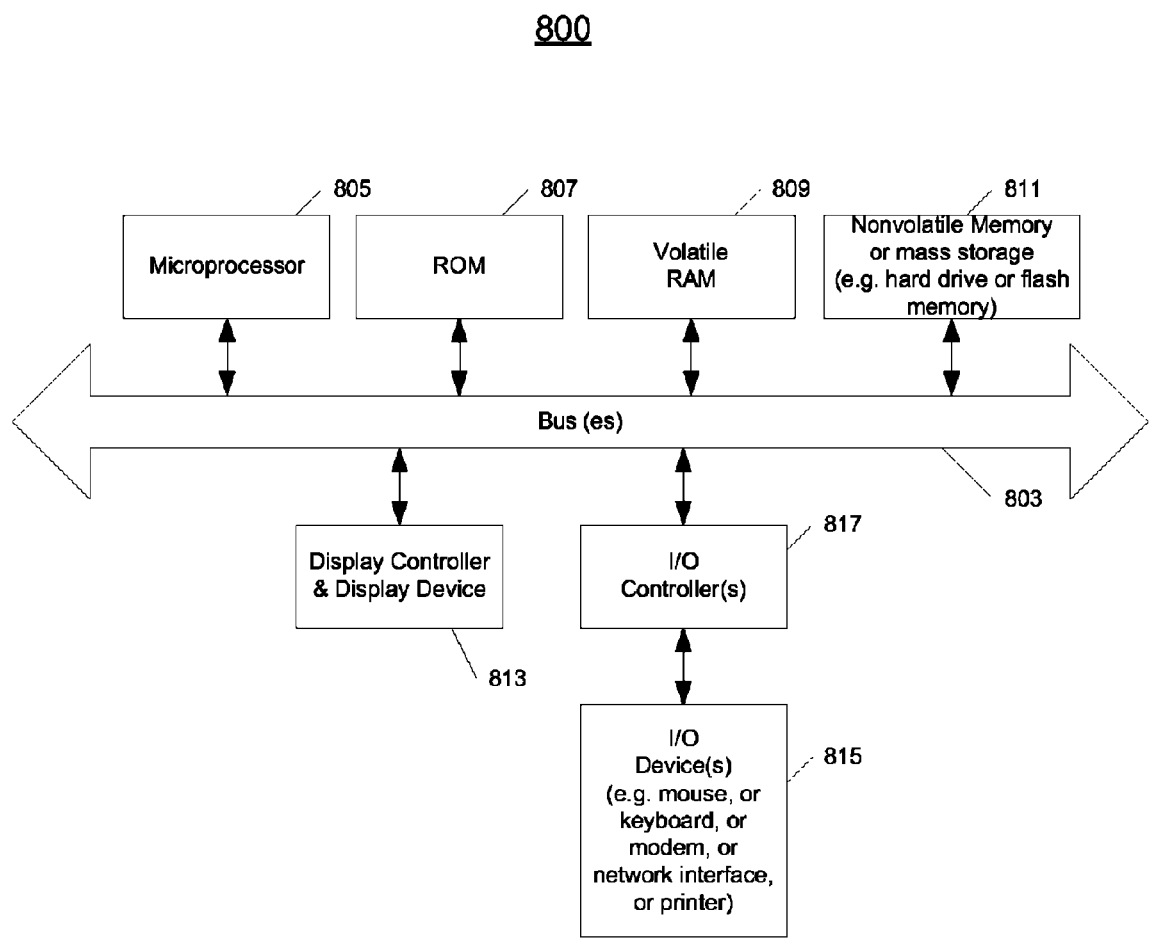
FIG. 8 illustrates one example of a data processing system such as a computer system, which may be used in conjunction with the embodiments described herein.

FIG. 8 shows one example of another data processing system such as a computer system, which may be used with one embodiment the present invention. For example, the system 800 may be implemented as a part of the system shown in FIG. 1. Note that while FIG. 8 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 8, the computer system 800, which is a form of a data processing system, includes a bus 803 which is coupled to a microprocessor(s) 805 and a ROM (Read Only Memory) 807 and volatile RAM 809 and a non-volatile memory 811. The microprocessor 805 may retrieve the instructions from the memories 807, 809, 811 and execute the instructions to perform operations described above. The bus 803 interconnects these various components together and also interconnects these components 805, 807, 809, and 811 to a display controller and display device 813 and to peripheral devices such as input/output (I/O) devices which may be mice, keyboards, modems, network interfaces, printers and other devices which are well known in the art. Typically, the input/output devices 815 are coupled to the system through input/output controllers 817. The volatile RAM (Random Access Memory) 809 is typically implemented as dynamic RAM (DRAM) which requires power continually in order to refresh or maintain the data in the memory.

The mass storage 811 is typically a magnetic hard drive or a magnetic optical drive or an optical drive or a DVD RAM or a flash memory or other types of memory systems which maintain data (e.g. large amounts of data) even after power is removed from the system. Typically, the mass storage 811 will also be a random access memory although this is not required. While FIG. 8 shows that the mass storage 811 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface or wireless networking interface. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A computer implemented method for executable code executed by a processing device, the method comprising:

annotating source code by user requests via a user interface, wherein the annotated source code includes the source code and one or more annotation code inserted at one or more selected code locations of the source code, wherein the annotated source code corresponds to one or more source files;

compiling the annotated source code for the executable code using one or more compilation settings and a switch setting, wherein the switch setting specifies whether to compile the annotation code, wherein the executable code corresponds to instructions compiled from the source code using the compilation settings if the switch setting specifies that the annotation code is not to be compiled, wherein the switch setting specifies that the annotation code is to be compiled, and wherein the executable code includes the instructions and one or more coverage instructions, each coverage instruction corresponding to one of the annotation code;

executing the executable code to collect code coverage information for the selected code locations of the source code into a data store, wherein the code coverage information is associated with a portion of the instructions for the selected code locations, and wherein no code coverage information is collected for remaining portion of the instructions in the executable code;

in response to receiving a code coverage request, retrieving the code coverage information from the data store; and generating a code coverage report from the code coverage information, wherein the code coverage report indicating whether one or more of the selected code locations are not covered when executing the executable code.

2. The method of claim 1, wherein the code coverage information includes a file name and a line number of the source files to identify a selected code location which is covered.

3. The method of claim 2, wherein the executable code includes one or more instructions compiled from the annotation code at the one of the selected code locations, and wherein the collection of the code coverage information comprises:

updating the data store for an entry corresponding to the selected code location according to the one or more instructions.

4. The method of claim 3, wherein the update comprises:

allocating the entry in the data store if the data store does not include the entry corresponding to the selected code locations; and storing the file name and the line number in the entry allocated.

5. The method of claim 4, further comprising:

updating a counter in the entry, the counter indicating a number of times the one or more instructions have been executed.

6. The method of claim 2, wherein the generation of code coverage report comprises:

scanning the annotated source code to identify file names and line numbers for the selected code locations; and comparing the file names and line numbers identified with the file name and the line number in the code coverage information to determine whether the one or more of the selected code locations are not covered.

7. The method of claim 1, wherein the annotation code is a single line of character string representing a block of code and wherein code coverage for a portion of the source files is not performed if the portion is not annotated.

8. The method of claim 1, wherein the code coverage request is received via an interface with instructions to access the data store, wherein the interface is registered to execute the instructions and wherein the instructions are compiled from the annotated source files and wherein code coverage information is obtained for only those locations of the source files which have been annotated with the annotation code.

9. A computer implemented method for executable code executed in a processing device, the method comprising:

annotating source code by user requests via a user interface, wherein the annotated source code includes the source code and one or more annotation code inserted at one or more selected code locations of the source code, wherein the annotated source code corresponds to one or more source files;

compiling the annotated source code using one or more compilation settings and a switch setting, wherein the switch setting specifies whether to compile the annotation code, wherein the executable code corresponds to instructions compiled from the source code using the compilation settings if the switch setting specifies that the annotation code is not to be compiled, wherein the switch setting specifies that the annotation code is to be compiled, and wherein the executable code includes the instructions and one or more coverage instructions, each coverage instruction corresponding to one of the annotation code, the coverage instructions including indicators corresponding to the selected code locations of the source code;

updating a data store when the executable code is executed to access the indicators, the data store storing code coverage information for the indicators accessed, wherein the code coverage information is associated with a portion of the instructions for the selected code locations, and wherein no code coverage information is collected for remaining portion of the instructions in the executable code; and generating a code coverage report for the selected code locations of the source code from the code coverage information of the data storage.

10. The method of claim 9, wherein the executable code the compiling comprises detecting an annotation identifying a block of code and in response to the detecting, inserting a copy of the coverage instruction into the executable code.

11. The method of claim 10, wherein the updating comprises:

determining a unique index according to the instructions, the unique index being associated with the one of the indicators accessed for an entry of the data store indexed by the unique index.

12. The method of claim 11, further comprising:

determining a file name and a line number corresponding to the one of the indicators accessed; and storing the file name and the line number in the entry of the data store.

13. The method of claim 12, wherein the compilation includes mapping the annotated source code with the executable and wherein the file name and the line number are determined based on the mapping between the annotated source code and the executable.

14. The method of claim 11, wherein the entry includes a counter, the method further comprises:

incrementing the counter for accessing the one of the indicators accessed.

15. The method of claim 14, wherein the code coverage information includes a count associated with the file name and the line number, and wherein the code coverage report indicates the source code at the selected code location has been executed a number of times corresponding to the count.

16. The method of claim 9, wherein the annotated source code includes an annotation code inserted into the source code, the annotation code representing initializing code, wherein the executable includes initializing instructions compiled from the initializing code, the method further comprising:

allocating the data store according to the initializing instructions.

17. The method of claim 16, wherein the generation of the code coverage report is based on a request received from an interface when executing the executable code, the method further comprising:

registering the interface with the initializing instructions and wherein the generating of the code coverage report can be performed at any point in time during the execution of the executable code.

18. A non-transitory machine-readable storage medium having instructions, when executed by a machine, cause the machine to perform a method, the method comprising:

annotating source code by user requests via a user interface, wherein the annotated source code includes the source code and one or more annotation code inserted at one or more selected code locations of the source code;

compiling the annotated source code for executable code using one or more compilation settings and a switch setting, wherein the switch setting specifies whether to compile the annotation code, wherein the executable code corresponds to instructions compiled from the source code using the compilation settings if the switch setting specifies that the annotation code is not to be compiled, wherein the switch setting specifies that the annotation code is to be compiled, and wherein the executable code includes the instructions and one or more coverage instructions, each coverage instruction corresponding to one of the annotation code;

execute executable code to collect code coverage information for the selected code locations of the source code into a data store, wherein the code coverage information is associated with a portion of the instructions for the selected code locations, and wherein no code coverage information is collected for remaining portion of the instructions in the executable code;

in response to receiving a code coverage request, retrieving the code coverage information from the data store; and generating a code coverage report from the code coverage information, wherein the code coverage report indicating whether one or more of the selected code locations are not covered when executing the executable code.

19. A non-transitory machine-readable storage medium having instructions, when executed by a machine, cause the machine to perform a method, the method comprising:

annotating source code by user requests via a user interface, wherein the annotated source code includes the source code and one or more annotation code inserted at one or more selected code locations of the source code;

compiling the annotated source code using one or more compilation settings and a switch setting, wherein the switch setting specifies whether to compile the annotation code, executable code corresponds to instructions compiled from the source code using the compilation settings if the switch setting specifies that the annotation code is not to be compiled, wherein the switch setting specifies that the annotation code is to be compiled, and wherein the executable code includes the instructions and one or more coverage instructions, each coverage instruction corresponding to one of the annotation code, the coverage instructions including indicators corresponding to the selected code locations of the source code;

updating a data store when the executable code is executed to access the indicators, the data store storing code coverage information for the indicators accessed, wherein the code coverage information is associated with a portion of the instructions for the selected code locations, and wherein no code coverage information is collected for remaining portion of the instructions in the executable code; and generating a code coverage report for the selected code locations of the source code from the code coverage information of the data storage.

20. A non-transitory machine-readable storage medium storing executable instructions, which when executed by a system, cause the system to perform a method comprising:

annotating source code by user requests via a user interface, wherein the annotated source code includes the source code and one or more annotation code inserted at one or more selected blocks of the source code;

compiling the annotated source code for executable code using one or more compilation settings and a switch setting, wherein the switch setting specifies whether to compile the annotation code, wherein the executable code corresponds to instructions compiled from the source code using the compilation settings if the switch setting specifies that the annotation code is not to be compiled, wherein the switch setting specifies that the annotation code is to be compiled, and wherein the executable code includes the instructions and one or more coverage instructions, each coverage instruction corresponding to one of the annotation code;

executing the executable code to collect code coverage information for the selected blocks of the source code, wherein no code coverage information is collected for a code block of the source code if the code block of the source code does not correspond to one of the selected code blocks of the source code;

updating a data store during the executing, the data store configured to store the code coverage information for the selected blocks; and generating a code coverage report, wherein the updating and the generating are capable of being performed at any point in time during the executing of the compiled code.

21. The medium as in claim 20 wherein the compiled code is a kernel of an operating system.

22. The medium as in claim 20, wherein code coverage analysis for a portion of the source code is not performed if the portion is not annotated.

23. The medium as in claim 22 wherein the compiled code is a kernel of an operating system and wherein code coverage information is obtained for only those portions of the source code into which the annotation code has been inserted.

24. An apparatus, comprising:

a memory storing executable instructions;

a user interface device;

a processor coupled to user interface device and the memory to execute the executable instructions from the memory, the processor being configured to:

annotate source code by user requests via a user interface, wherein the annotated source code includes the source code and one or more annotation code inserted at one or more selected code locations of the source code, compile the annotated source code for executable code using one or ore compilation settings and a switch setting, wherein the switch setting specifies whether to compile the annotation code, wherein the executable code corresponds to instructions compiled from the source code using the compilation settings if the switch setting specifies that the annotation code is not to be compiled, wherein the switch setting specifies that the annotation code is to be compiled, and wherein the executable code includes the instructions and one or more coverage instructions, each coverage instruction corresponding to one of the annotation code, execute the executable code to collect code coverage information for the selected code locations of the source code into a data store, wherein the code coverage information is associated with a portion of the instructions for the selected code locations, and wherein no code coverage information is collected for remaining portion of the instructions in the executable code, in response to receiving a code coverage request, retrieve the code coverage information from the data store, and generate a code coverage report from the code coverage information, wherein the code coverage report indicating whether one or more of the selected code locations are not covered when executing the executable code.

* * * * *